(12) United States Patent
DeMarco et al.

(10) Patent No.: US 7,970,506 B2
(45) Date of Patent: Jun. 28, 2011

(54) SYSTEM FOR MAINTAINING COMMUNICATION BETWEEN TEAMS OF VEHICLES

(75) Inventors: Stephen J. DeMarco, Binghamton, NY (US); Nader Mehravari, Ithaca, NY (US); Robert J. Szczerba, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 629 days.

(21) Appl. No.: 11/334,871

(22) Filed: Jan. 19, 2006

(65) Prior Publication Data

US 2007/0168090 A1    Jul. 19, 2007

(51) Int. Cl.
*G01S 13/93* (2006.01)
(52) U.S. Cl. ............... 701/23; 701/301; 342/20; 342/29
(58) Field of Classification Search ............... 701/213, 701/3, 25, 23, 301; 345/442; 342/1, 29, 342/104, 20; 244/3.15, 3.16, 3.18; 709/223
See application file for complete search history.

(56) References Cited

U.S. PATENT DOCUMENTS

| | | | |
|---|---|---|---|
| 5,564,650 A | 10/1996 | Tucker et al. | |
| 5,648,901 A * | 7/1997 | Gudat et al. | 701/23 |
| 5,819,008 A * | 10/1998 | Asama et al. | 700/255 |
| 5,923,270 A * | 7/1999 | Sampo et al. | 340/988 |
| 6,115,580 A | 9/2000 | Chuprun et al. | |
| 6,122,572 A | 9/2000 | Yavnai | |
| 6,338,011 B1 | 1/2002 | Furst et al. | |
| 6,377,875 B1 | 4/2002 | Schwaerzler | |
| 6,393,362 B1 * | 5/2002 | Burns | 701/301 |
| 6,484,072 B1 | 11/2002 | Anderson et al. | |
| 6,653,970 B1 | 11/2003 | Mitra | |
| 6,694,228 B2 | 2/2004 | Rios | |
| 6,724,340 B1 | 4/2004 | Carlos et al. | |
| 6,792,363 B1 | 9/2004 | Bye | |
| 6,871,816 B2 | 3/2005 | Nugent et al. | |
| 7,024,340 B2 * | 4/2006 | Nichols et al. | 702/188 |
| 7,123,169 B2 * | 10/2006 | Farmer et al. | 340/945 |
| 7,299,130 B2 * | 11/2007 | Mulligan et al. | 701/213 |
| 7,457,619 B2 * | 11/2008 | Ariyur et al. | 455/423 |
| 7,539,557 B2 * | 5/2009 | Yamauchi | 700/245 |
| 7,747,360 B2 * | 6/2010 | Canu-Chiesa et al. | 701/3 |
| 7,769,502 B2 * | 8/2010 | Herman | 701/6 |
| 2003/0004642 A1 * | 1/2003 | Lin et al. | 701/301 |
| 2003/0164794 A1 | 9/2003 | Haynes et al. | |
| 2004/0024527 A1 * | 2/2004 | Patera | 701/301 |
| 2004/0030449 A1 | 2/2004 | Solomon | |
| 2004/0068415 A1 | 4/2004 | Solomon | |
| 2004/0134336 A1 | 7/2004 | Solomon | |
| 2004/0174822 A1 | 9/2004 | Bui | |
| 2004/0193334 A1 | 9/2004 | Carlsson et al. | |
| 2005/0018627 A1 | 1/2005 | Cardei et al. | |
| 2005/0197749 A1 * | 9/2005 | Nichols et al. | 701/3 |
| 2006/0058931 A1 * | 3/2006 | Ariyur et al. | 701/23 |
| 2006/0089766 A1 * | 4/2006 | Allard et al. | 701/23 |

\* cited by examiner

*Primary Examiner* — Tuan C To
(74) *Attorney, Agent, or Firm* — Tarolli, Sundheim, Covell & Tummino LLP

(57) ABSTRACT

A system maintains communication between a plurality of unmanned vehicles within an environment. The system includes a sensor component and an evaluator. The sensor component senses objects within the environment. The sensor component is located on a first unmanned vehicle. The evaluator evaluates data from the sensor component. The evaluator is located on the first unmanned vehicle. The evaluator compares data for the first unmanned vehicle and a second unmanned vehicle and determines whether a trajectory of one of the first and second unmanned vehicles may be modified to maintain communication between the first unmanned vehicle and the second unmanned vehicle.

17 Claims, 5 Drawing Sheets

SYSTEM FOR MAINTAINING COMMUNICATION BETWEEN TEAMS OF VEHICLES

FIELD OF THE INVENTION

The present invention relates to a system for maintaining communication between unmanned vehicles during a mission, and more particularly, to a system for predicting trajectories to improve quality of communication service.

BACKGROUND OF THE INVENTION

Teams of unmanned aerial vehicles (UAVs) and unmanned ground vehicles (UGVs) may support a battalion of human fighters on a battlefield by moving in advance of the battalion, acting as scouts and as armed reconnaissance vehicles. The UAVs may act as teams or as independent entities. The UAVs may communicate over networked radio links between each other and to one or more human commanders. As the UAVs travel along trajectories, obstructions such as hills and trees may interrupt line-of-sight (LOS) between the UAVs. Consequently, direct data links between the UAVs may be interrupted.

An interruption may occur during difficult and treacherous combat situations and may result in loss of a UAV. For example, a UAV may sense an enemy and transmit a location and image of the enemy to a commander, requesting instructions. The commander may transmit an instruction to the UAV to take evasive maneuvers. However, if LOS interruption occurs in that transmission and the transmission is not received by the UAV, the UAV may be subsequently destroyed by enemy action.

A LOS interruption may typically be addressed on the battlefield through the use of relay towers, terrestrial reflectors, and/or high flying aircrafts providing the function of relays forming an interconnection point between two UAVs lacking LOS between them. A relay, if available, may provide a "one more hop" route for transmission of messages between the two UAVs.

Such external relay agents (towers, terrestrial reflectors, high flying aircrafts, etc.) may not be available in forward regions of battlefields. When available, an infrastructure of land lines, relay towers, high flying relay aircraft, and satellites typically may provide a network of alternative routes for these UAV messages. This set of relays and routers may be managed to provide a specific quality of service (QOS) to the network and to react to demands on the network for maintaining a minimum level of QOS. Network control may be centralized, decentralized, or a hybrid of both. Network control algorithms may be predicated upon a specified number of UAVs in the network and random movements of the UAVs with pseudo-random messages between the UAVs at random times.

Conventional approaches for managing the relays and routers have a number of shortcomings. For example, assumptions about the randomness of movements of the UAVs and their message traffic may represent only first order approximations. These assumptions do not consider that patterns of movement of the UAVs, as the UAVs carry out their mission, follow certain trajectories that may be known. Although trajectories may vary throughout a mission, such variations may be within known parameters and hence their position may be predictable.

The volume and pattern of message traffic between UAVs may also be at least partially ordered. For a particular team of UAVs, on a specific mission, there may generally be light message traffic as the UAVs move towards a target, moderate traffic as the UAVs perform targeting functions, high traffic when the UAVs engage in combat, and light traffic as the UAVs leave a target area. Consequently, the magnitude and type of messages for a particular UAV team may be predicted.

However, conventional management of a radio network is planned and sized for pseudo-random movement of the UAVs and pseudo-random messages. When combat ensues, the message traffic will increase in what would appear to be a burst or leap in magnitude of message traffic that may overload the radio network. Loss of LOS or degradation of QOS between UAVs at critical times may result in a message not being received, an acknowledgement not being sent, retransmission of the message, any of which may result in additional strain on the radio network.

A crucial time may be during combat as the UAVs move to avoid detection or to avoid receipt of enemy fire. The management of a network may react to the loss of LOS or degradation of QOS connectivity by changing routing algorithms thereby resulting in additional strain on the radio network more hops for a message to reach its destination. Since this conventional management is reactive in nature, there may be a delay while the network reforms and delivery of messages may be delayed, perhaps jeopardizing survival of one or more UAVs.

SUMMARY OF THE INVENTION

A system in accordance with the present invention maintains communication between a plurality of unmanned vehicles within an environment. The system includes a sensor component and an evaluator. The sensor component senses objects within the environment. The sensor component is located on a first unmanned vehicle. The evaluator evaluates data from the sensor component. The evaluator is located on the first unmanned vehicle. The evaluator compares data for the first unmanned vehicle and a second unmanned vehicle and determines whether a trajectory of one of the first and second unmanned vehicles may be modified to maintain communication between the first unmanned vehicle and the second unmanned vehicle.

A computer program product in accordance with the present invention maintains communication between a plurality of unmanned vehicles within an environment. The computer program product includes: a first instruction for sensing objects within the environment by a sensor component; a second instruction for evaluating data from the sensor component; a third instruction for comparing data for a first unmanned vehicle and a second unmanned vehicle; and a fourth instruction for determining whether a trajectory of one of the first and second unmanned vehicles may be modified to maintain communication between the first unmanned vehicle and the second unmanned vehicle.

A method in accordance with the present invention maintains communication between a plurality of unmanned vehicles within an environment. The method includes the steps of: sensing objects within the environment by a sensor component; evaluating data from the sensor component; comparing data for a first unmanned vehicle and a second unmanned vehicle; determining whether a trajectory of one of the first and second unmanned vehicles may be modified to maintain communication between the first unmanned vehicle and the second unmanned vehicle; and utilizing line of sight, data link quality of service, and router efficiency for calculating predetermined acceptable limits for communication maintenance.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF AN EXAMPLE EMBODIMENT

Teams of UAVs may require automatic and efficient means for establishing and maintaining network data paths between team members as the team members move in a physically dynamic environment. Traditionally, sophisticated network routing protocols are used to automatically configure routes between the team members and between the team and external entities. Such network routing protocols often fail. These protocols require many message exchanges for a given bandwidth, do not account for the physical location and/or trajectory of network nodes or the volume and patterns of the data traffic, and do not readily process the dynamic and rapid entry and departure of network nodes.

Conventional efforts in improving such shortcomings have been concentrated on developing more sophisticated variants of existing mobile network routing protocols. Such enhancements result in the execution of more complex algorithms on embedded on-board systems requiring more computing and communication resources, which may be scarce.

A system in accordance with the present invention provides an innovative and unique approach in solving the problem of maintaining network data paths between teams of UAVs and between individual members thereof. Instead of depending on data network routing protocols to maintain network data paths, the system may utilize the UAVs' embedded trajectory and physical path computation engines for modifying each UAV's trajectory thereby avoiding changes to the established data network paths between the UAVs. Instead of utilizing more complex mobile network data routing protocols in reacting to frequent changes in the connectivity patterns between the UAVS, the system may minimize or prevent changes to the connectivity patterns between the UAVs.

Figure 1:
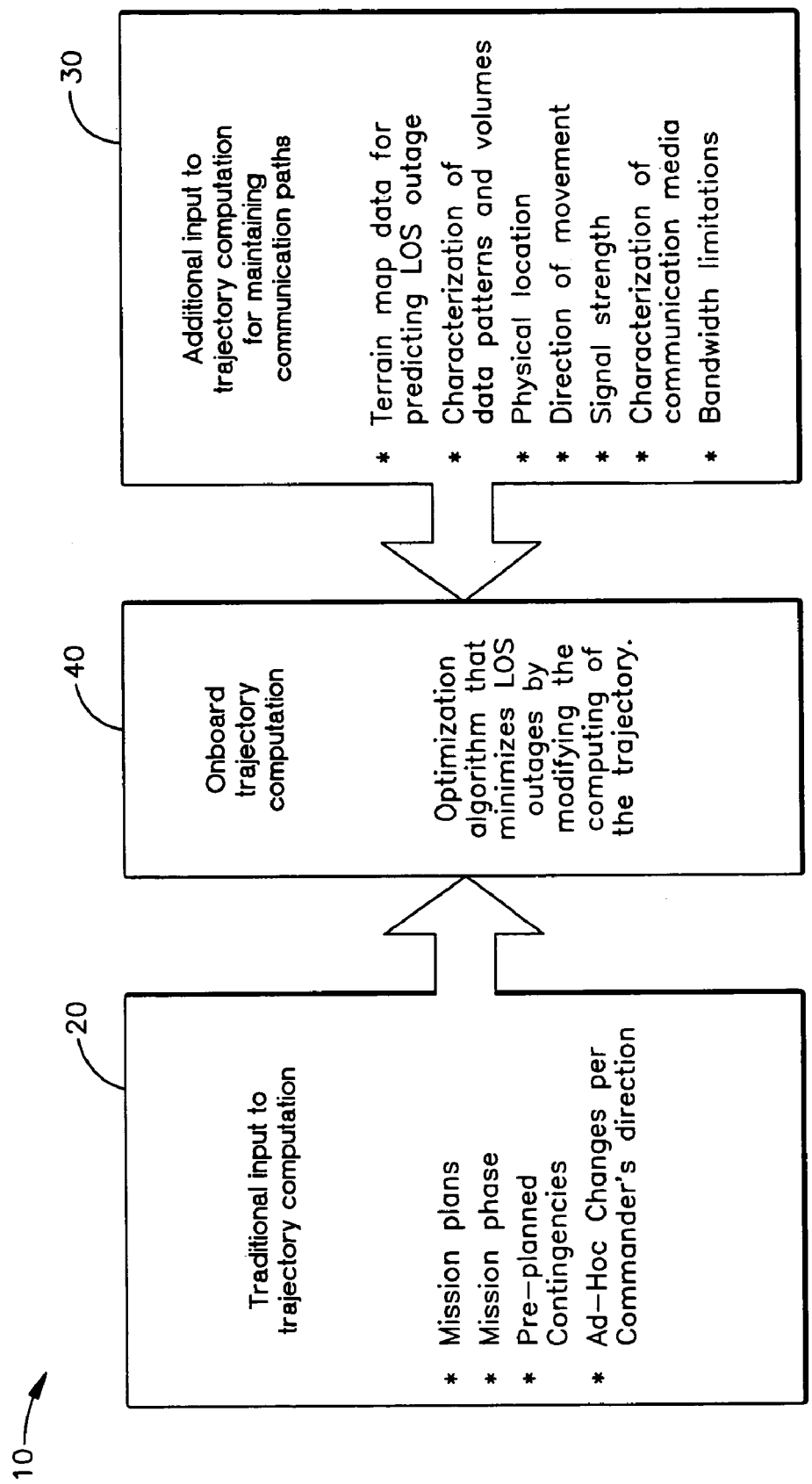
FIG. 1 is a schematic representation of an example system in accordance with the present invention.

FIG. 1 shows an example system 10 having information inputs 20, 30 to an onboard trajectory computer 40 that may enable predictive trajectory algorithms to function.

Each member of a team of UAVs may be equipped with an identical system 10. The system 10 may include a mission processor capable of computing a trajectory of each UAV of the team during a mission, a digital terrain map enabling a flight path computer to compute when LOS outages may occur along the trajectory, and an optimization algorithm for minimizing LOS outages by modifying a computed trajectory of the UAVs while still completing the mission and by adjusting a set of UAV trajectories to maintain no more than one or two message hops over a radio network between the UAVs. The system 10 may further include sensors for providing situational awareness of the environment and enabling a UAV to determine that there may be new obstructions not in the digital terrain map and a device for monitoring data link operations and quality of service (QOS) against predicted QOS minimums, such as received signal strength, link latency, number of router hops, and range/direction/velocity of other members of the team.

The system 10 may further include trajectory adjustment algorithms for enabling each individual UAV to make minor adjustments to its own trajectory to avoid these newly sensed obstructions and to adjust the LOS outage calculations and/or QOS metrics accordingly and a learning system for continually monitoring specific technical performance measures (TPMs) during execution of the mission. If the difference between the actual TPMs and their expected value is greater than a preset threshold for that particular mission, then corrective action may be taken on an ad-hoc basis.

Figure 2:
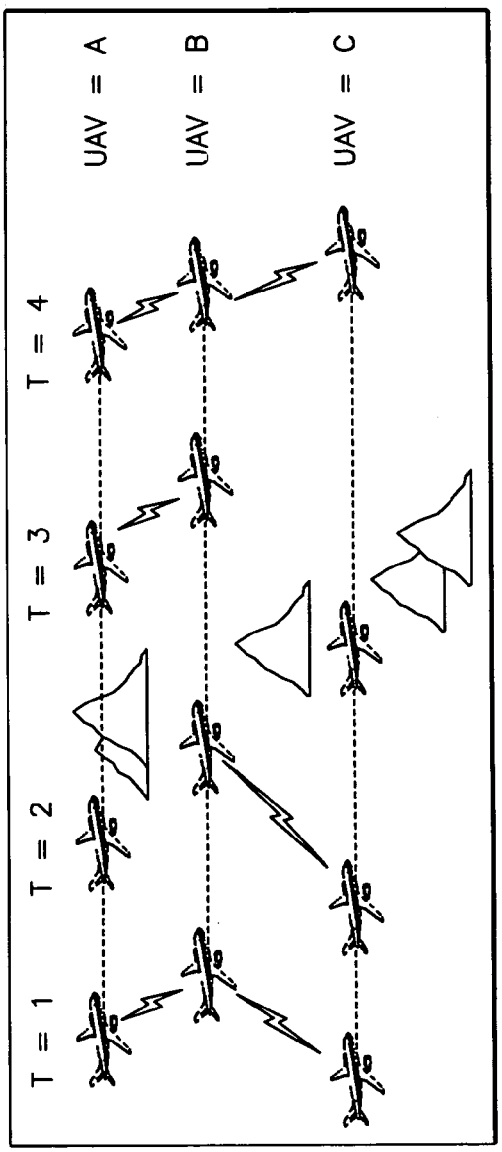
FIG. 2 is a schematic representation of an example operation of a system in accordance with the present invention.
Figure 3:
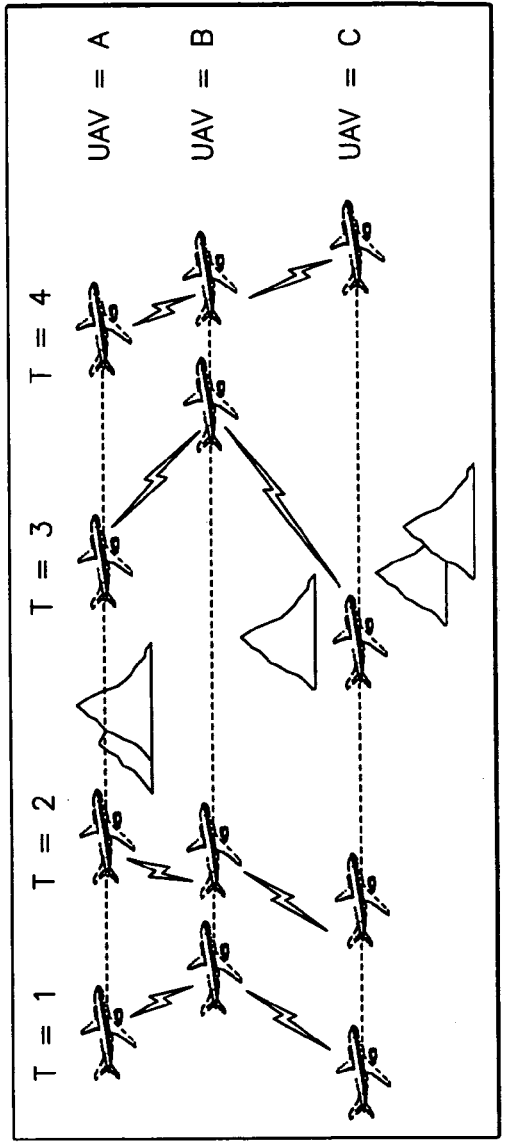
FIG. 3 is a schematic representation of another example operation of a system in accordance with the present invention.
Figure 4:
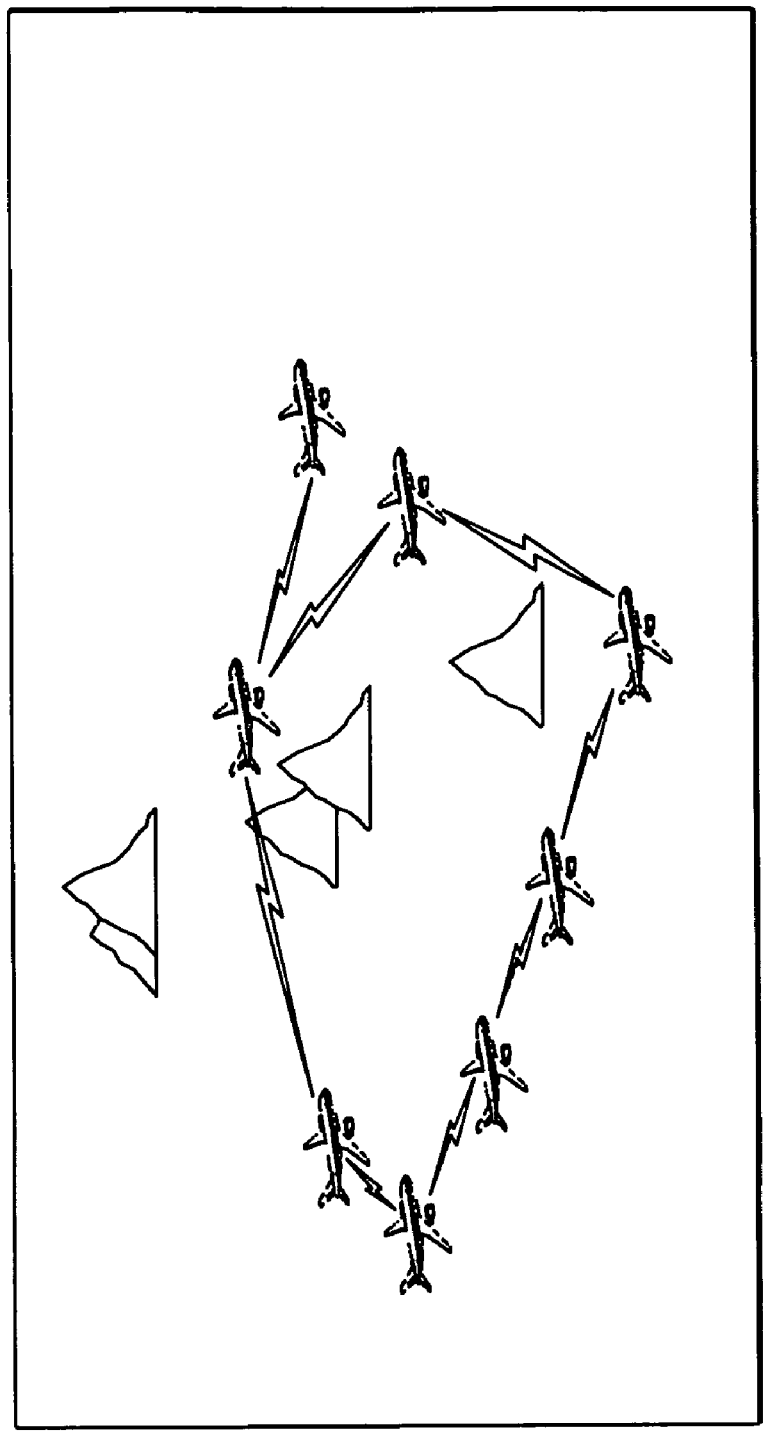
FIG. 4 is a schematic representation of still another example operation of a system in accordance with the present invention.

FIGS. 2-4 show an example effect of non-optimized trajectories on three UAVs (A, B, C) at four times (T1, T2, T3, T4) flying through a mountainous terrain. In FIG. 2, LOS is maintained between A, B, and C except at T2, when A and B do not and at T3 when B and C do not.

The trajectories may be different if the trajectories are optimized for LOS connectivity. For example, B may rise in height at T2 and at T3 so that LOS may be maintained. Alternatively, as in FIG. 3, the speed of B may be optimized to maintain LOS between A and B without rising in height. B may slow down at T=2 and speed up to maintain LOS at T=3. The following diagram shows this case.

Various other optimizations are possible, depending upon desired UAV behaviors. FIG. 4 shows a complex optimization with QOS and LOS improved through a one hop relay.

Figure 5:
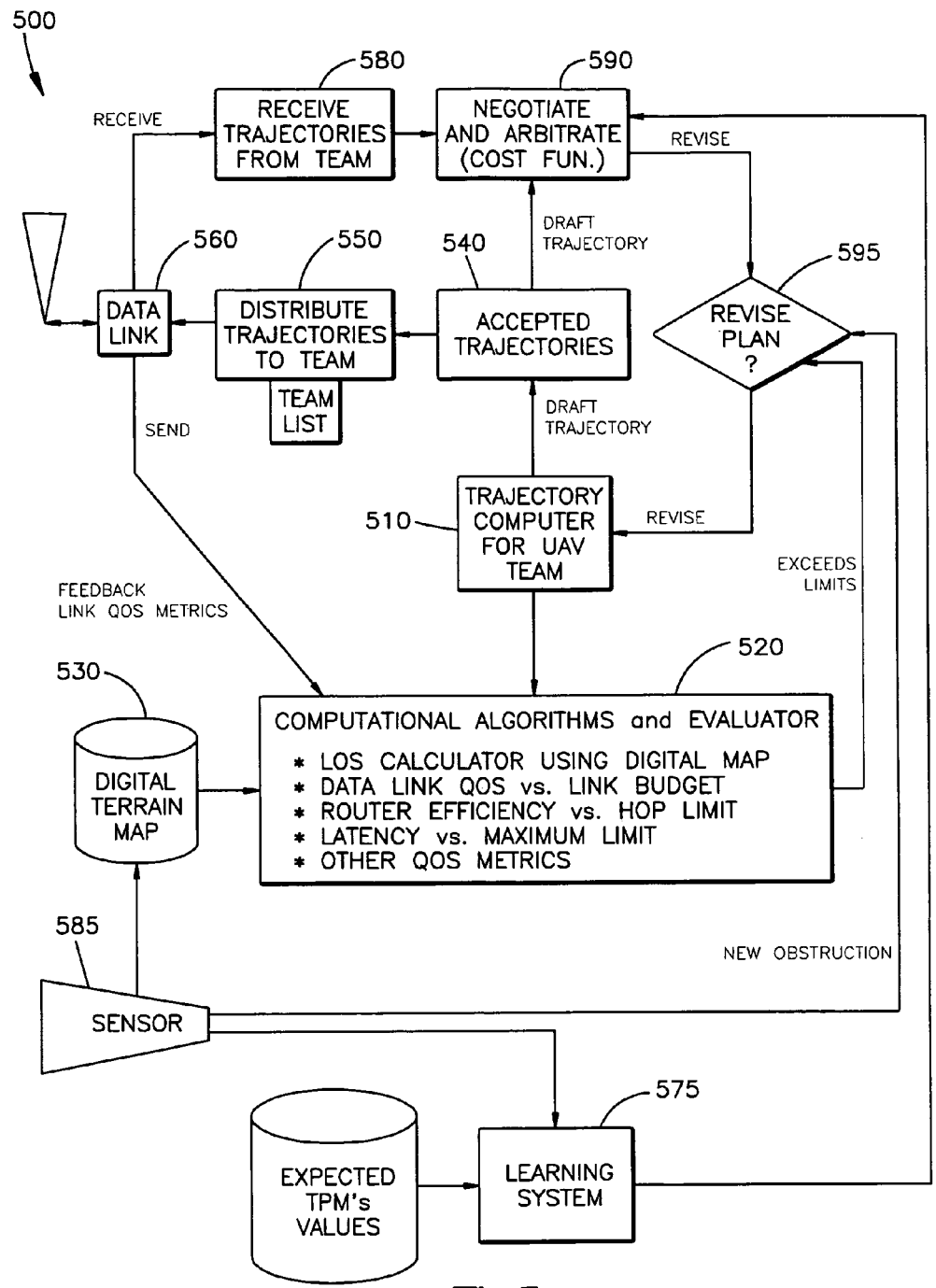
FIG. 5 is a schematic representation of another example system in accordance with the present invention.

FIG. 5 shows an example system 500 located on an UAV in accordance with the present invention. In step 510, a Trajectory Computer Subsystem calculates an initial trajectory of a plurality of UAVs. Following step 510, the system 500 proceeds to step 520. In step 520, the system 500, using Computational Algorithms & an Evaluator, verifies whether LOS is obtained within acceptable limits. In step 520, the system 500 compares LOS, data link QOS, router efficiency, and other QOS metrics to preset acceptable limits and calculate when these are exceeded and the plan needs to be revised. Following step 510, the system 500 also sends an initial trajectory to step 540.

If LOS is within acceptable limits, the system 500 is finished pending new information. Otherwise, the system 500 proceeds to step 595. In step 595, the system 500 revises the mission plan.

In step 530, the system 500 employs a digital terrain map. In step 540, an initial set of trajectories from step 510 is utilized by an Accepted Trajectories Subsystem as a draft set of trajectories. Following 540, the system proceeds to step 550. In step 550, the system 500 distributes the draft trajectories to other UAVs over a Data Link 560. In step 580, the system 500 receives respective trajectories of the other UAVs via the Data Link 560. In step 590, the system 500 utilizes a Negotiate and Arbitrate Subsystem with a cost function to evaluate the respective draft trajectories from the UAV and from other UAVs. If the draft trajectories are in agreement, then the draft trajectories become accepted trajectories. Otherwise, the trajectories plan needs to be revised in step 595.

An iterative approach algorithm in the Negotiate and Arbitrate Subsystem may quickly reach a solution.

The UAV's sensor(s) 585 may always be scanning for obstructions. If there are no new obstructions, the system 500 remains inactive at step 520. If the sensor(s) 585 detect a new obstruction, the system 500 updates the digital terrain map of step 530. Also, the system 500 notifies step 600 that the plan needs to be changed. The system 500 also notifies a Learning Subsystem 575 of the new obstruction.

The Learning Subsystem 575 may change the cost function in the Negotiate and Arbitrate Subsystem 590. For example, if new obstructions are being detected by the sensor(s) 595, more distance between the UAVs and obstructions may be desirable. Or, more LOS interruptions may be accepted.

The system in accordance with the present invention may maintain a high quality QOS radio frequency data link between teams of UAVs. The system may modify the trajectory of one or more of the team members to move in a special path that maintains good connectivity to the predicted trajectories of the other team member. This special path may be adjusted on an ad-hoc basis during a mission in response to changes in the digital terrain map or to unexpected occurrences or obstructions. The system thereby reduces overhead of the radio frequency network and enables more efficient employment of router algorithms. The system also reduces expected network latency and provides greater information throughput.

The system in accordance with the present invention also may provide additional capability to the coordination of teams of heterogeneous unmanned vehicles. The system may solve the problem of maintaining network data paths between teams of unmanned vehicles and between members thereof. Instead of depending on data network routing protocols to maintain network data paths, the system utilizes an on-board Mission Management System of embedded trajectory and physical path computation engines to modify each vehicle's trajectory for avoiding changes to the established data network paths between the vehicles. Instead of utilizing more complex mobile network data routing protocols to react to frequency changes to the connectivity patterns between the vehicles, the system may minimize or prevent changes to the connectivity patterns between them.

Figure 6:
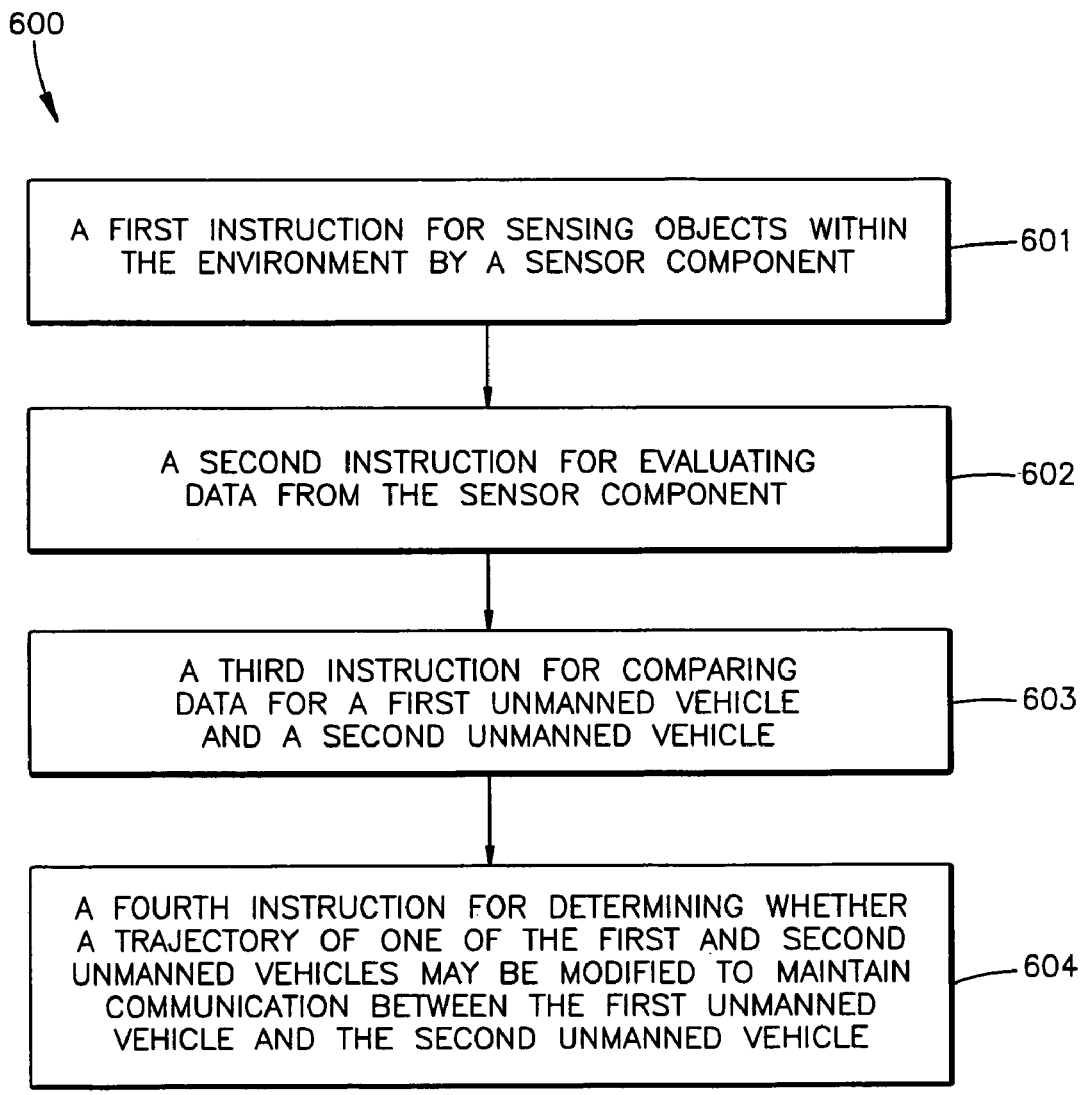
FIG. 6 is a schematic representation of an example computer program product in accordance with the present invention.

As shown in FIG. 6, an example computer program product 600 in accordance with the present invention maintains communication between a plurality of unmanned vehicles within an environment. The computer program product 600 includes: a first instruction 601 for sensing objects within the environment by a sensor component; a second instruction 602 for evaluating data from the sensor component; a third instruction 603 for comparing data for a first unmanned vehicle and a second unmanned vehicle; and a fourth instruction 604 for determining whether a trajectory of one of the first and second unmanned vehicles may be modified to maintain communication between the first unmanned vehicle and the second unmanned vehicle.

In order to provide a context for the various aspects of the present invention, the following discussion is intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules.

Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications argument model. However, some, if not all aspects of the invention can be practiced on stand-alone computers. In a distributed computing environment, program modules may be located in both local and remote memory storage devices.

An exemplary system for implementing the various aspects of the invention includes a conventional server computer, including a processing unit, a system memory, and a system bus that couples various system components including the system memory to the processing unit. The processing unit may be any of various commercially available processors. Dual microprocessors and other multi-processor architectures also can be used as the processing unit. The system bus may be any of several types of bus structure including a memory bus or memory controller, a peripheral bus, and a local bus using any of a variety of conventional bus architectures. The system memory includes read only memory (ROM) and random access memory (RAM). A basic input/output system (BIOS), containing the basic routines that help to transfer information between elements within the server computer, such as during start-up, is stored in ROM.

The server computer further includes a hard disk drive, a magnetic disk drive, e.g., to read from or write to a removable disk, and an optical disk drive, e.g., for reading a CD-ROM disk or to read from or write to other optical media. The hard disk drive, magnetic disk drive, and optical disk drive are connected to the system bus by a hard disk drive interface, a magnetic disk drive interface, and an optical drive interface, respectively. The drives and their associated computer-readable media provide nonvolatile storage of data, data structures, computer-executable instructions, etc., for the server computer. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM, including an operating system, one or more application programs, other program modules, and program data. A user may enter commands and information into the server computer through a keyboard and a pointing device, such as a mouse. Other input devices (not shown) may include a microphone, a joystick, a game pad, a satellite dish, a scanner, or the like. These and other input devices are often connected to the processing unit through a serial port interface that is coupled to the system bus, but may be connected by other interfaces, such as a parallel port, a game port or a universal serial bus (USB). A monitor or other type of display device is also connected to the system bus via an interface, such as a video adapter. In addition to the monitor, computers typically include other peripheral output devices (not shown), such as speaker and printers.

The server computer may operate in a networked environment using logical connections to one or more remote computers, such as a remote client computer. The remote computer may be a workstation, a server computer, a router, a peer device or other common network node, and typically includes many or all of the elements described relative to the server computer. The logical connections include a local area network (LAN) and a wide area network (WAN). Such networking environments are commonplace in offices, enterprise-wide computer networks, intranets and the internet.

When used in a LAN networking environment, the server computer is connected to the local network through a network interface or adapter. When used in a WAN networking environment, the server computer typically includes a modem, or is connected to a communications server on the LAN, or has other means for establishing communications over the wide area network, such as the internet. The modem, which may be internal or external, is connected to the system bus via the serial port interface. In a networked environment, program modules depicted relative to the server computer, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer, unless otherwise indicated. Such acts and operations are sometimes referred to as being computer-executed. It will be appreciated that the acts and symbolically represented operations include the manipulation by the processing unit of electrical signals representing data bits which causes a resulting transformation or reduction of the electrical signal representation, and the maintenance of data bits at memory locations in the memory system (including the system memory, hard drive, floppy disks, and CD-ROM) to thereby reconfigure or otherwise alter the computer system's operation, as well as other processing of signals. The memory locations where such data bits are maintained are physical locations that have particular electrical, magnetic, or optical properties corresponding to the data bits.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A system for maintaining communication between a plurality of unmanned vehicles within an environment, said system comprising:
   a sensor component configured to sense objects within the environment, said sensor component being located on a first unmanned vehicle; and
   an evaluator configured to evaluate data from said sensor component, said evaluator being located on said first unmanned vehicle,
   said evaluator being configured to determine if a sensed object in the environment is expected to interfere with communications between the first unmanned vehicle and a second unmanned vehicle of the plurality of unmanned vehicles and compare trajectory data for said first unmanned vehicle and a second unmanned vehicle to determine whether a trajectory of one of said first and second unmanned vehicles may be modified to maintain communication between said first unmanned vehicle and said second unmanned vehicle.

2. The system as set forth in claim 1 further including a trajectory computer subsystem for calculating an initial trajectory for said first and second unmanned vehicles.

3. The system as set forth in claim 2 wherein said evaluator determines whether communication is maintained between said first and second unmanned vehicles within predetermined acceptable limits.

4. The system as set forth in claim 2 wherein said evaluator determines whether a trajectory of one of said first and second unmanned vehicles and a third unmanned vehicle may be modified to maintain communication between said first unmanned vehicle, said second unmanned vehicle, and said third unmanned vehicle.

5. The system as set forth in claim 1 wherein said evaluator determines whether communication is maintained between said first and second unmanned vehicles within acceptable limits, said evaluator utilizing line of sight, data link quality of service, and router efficiency for calculating the acceptable limits.

6. The system as set forth in claim 1 further including a digital terrain map for maintaining a current model of the environment.

7. The system as set forth in claim 1 further including a data link for communicating between said first unmanned vehicle and said second unmanned vehicle.

8. The system as set forth in claim 1 further including a data link for distributing an initial set of draft trajectories from said first unmanned vehicle to said second unmanned vehicle and a third unmanned vehicle.

9. The system as set forth in claim 1 further including a plan reviser for modifying the trajectory of said second unmanned vehicle to maintain communication with said first unmanned vehicle.

10. The system as set forth in claim 1 further including a learning subsystem for altering criteria for acceptable trajectories.

11. The system as set forth in claim 1, the evaluator being configured to determine whether the trajectory of both of said first and second unmanned vehicles may be modified to maintain communication between said first unmanned vehicle and said second unmanned vehicle.

12. A system for maintaining communication between a plurality of unmanned vehicles within an environment, said system comprising:
    a sensor component for sensing objects within the environment and updating a digital map to include at least one obstacle within the environment, said sensor component being located on a first unmanned vehicle; and
    an evaluator for evaluating data from said sensor component, said evaluator being located on said first unmanned vehicle,
    said evaluator comparing data for said first unmanned vehicle and a second unmanned vehicle and identifying obstacles within the environment that are positioned to obstruct communications between a first unmanned vehicle and a second unmanned vehicle of the plurality of unmanned vehicles given a current speed and trajectory of each of the first and second unmanned vehicles, and determining whether one of the speed and the trajectory of each of said first and second unmanned vehicles can be modified to mitigate potential disruptions in communication between said first unmanned vehicle and said second unmanned vehicle in view of the data for each of the first and second unmanned vehicles and the identified obstacles;

13. The system as set forth in claim 12 wherein said evaluator determines whether communication is maintained between said first and second unmanned vehicles within predetermined acceptable limits.

14. The system as set forth in claim 12 wherein said evaluator determines whether one of a speed and a velocity of each of said first unmanned vehicle, said second unmanned vehicle, and a third unmanned vehicle can be modified to maintain communication between said first unmanned vehicle, said second unmanned vehicle, and said third unmanned vehicle.

15. The system as set forth in claim 12, the evaluator further comprising a digital terrain map for maintaining a current model of the environment.

16. The system as set forth in claim 12 further including a data link for distributing an initial set of draft trajectories from said first unmanned vehicle to said second unmanned vehicle and a third unmanned vehicle.

17. The system as set forth in claim 12, the evaluator determining whether the speed and the trajectory of both of said first and second unmanned vehicles can be modified to mitigate potential disruptions in communication.

* * * * *